United States Patent [19]

Becker et al.

[11] Patent Number: 4,705,605
[45] Date of Patent: Nov. 10, 1987

[54] METHOD FOR PRODUCING A SPINNING NOZZLE PLATE

[75] Inventors: Erwin Becker; Wolfgang Ehrfeld, both of Karlsruhe; Peter Hagmann, Leopoldshafen, all of Fed. Rep. of Germany

[73] Assignee: Kernforschungszentrum Karlsruhe GmbH, Karlsruhe, Fed. Rep. of Germany

[21] Appl. No.: 863,989

[22] Filed: May 16, 1986

[30] Foreign Application Priority Data

May 17, 1985 [DE] Fed. Rep. of Germany ....... 3517730

[51] Int. Cl.$^4$ .................................................. C25D 1/08
[52] U.S. Cl. ...................................................... 204/11
[58] Field of Search ........................................... 204/11

[56] References Cited

U.S. PATENT DOCUMENTS

| 3,167,489 | 1/1965 | Hadjian | 204/11 |
| 3,449,221 | 6/1969 | Thomas | 204/11 |
| 3,506,545 | 4/1970 | Garwin et al. | 204/15 |
| 3,512,247 | 5/1970 | Schaer et al. | 29/527.6 |
| 3,853,715 | 12/1974 | Romankiw | 204/15 |
| 4,246,076 | 1/1981 | Gardner | 204/11 |
| 4,404,060 | 9/1983 | Trausch | 156/632 |

Primary Examiner—T. M. Tufariello
Attorney, Agent, or Firm—Spencer & Frank

[57] ABSTRACT

A spinning nozzle plate having nozzle capillaries is produced by depositing a layer 11 of a material whose characteristics can be changed by high-energy radiation (resist material) on a galvanic electrode 12. After resist layer 11 is irradiated in a predetermined pattern and after resist material is selectively removed by a treatment which utilizes the different material characteristics resulting from the irradiation, columns of resist material remain on galvanic electrode 12 to serve as negatives 21 of the nozzle capillaries. A galvanic layer 31 which encloses the negatives 21 of the nozzle capillaries is then produced on the galvanic electrode 12. Then the galvanic layer 31 is levelled and the negatives 21 are removed, as is the galvanic electrode 12. The process is particularly useful for producing spinning nozzle plates having nozzle capillaries with profiles of a special shape, essentially if the cross-sectional dimensions of the nozzle capillaries are small.

19 Claims, 13 Drawing Figures ically illus-
METHOD FOR PRODUCING A SPINNING NOZZLE PLATE

CROSS-REFERENCE TO RELATED APPLICATION

The subject matter of the present application is related in part to that of Applicants' copending application (Ser. No. 06/863,987, filed May 16th 1986), entitled METHOD FOR PRODUCING SPINNING NOZZLE PLATES, the related application being assigned to the assignee of the present application.

BACKGROUND OF THE INVENTION

The present invention relates to a method for producing a spinning nozzle plate having nozzle capillaries.

When fibers of organic or inorganic material are produced in large-scale industrial systems, the starting material is pressed, in a flowable state, through spinning nozzle plates which are equipped with a plurality of spinning nozzle channels. In most cases, the spinning nozzle channels are composed of nozzle capillaries through which the material to be spun is discharged and a significantly wider preliminary channel into which the material to be spun is fed. The preliminary channels are generally cylindrical or funnelshaped, and can be produced relatively easily by drilling or piercing. The nozzle capillaries may have profiles of a special shape (for example, star-shaped cross sections) and require more complicated techniques, e.g. wire erosion or erosive countersinking. Nozzle capillaries with specially shaped, non-circular cross sections will hereafter be deemed "profiled" nozzle capillaries.

Spinning nozzle plates are parts which are subject to wear. Spinning nozzle plates having profiled nozzle capillaries, in particular, constitute a considerable cost factor during production of fiber products when the plates are produced in the prior art manner. Moreover, in the prior art manner of manufacturing profiled nozzle capillaries, the lower critical dimension limit that can be realized with justifiable expenditures generally lies at about 30 μm. This limits the configuration of the filaments that can be produced.

SUMMARY OF THE INVENTION

Based on this state of the art, it is an object of the present invention to provide a method for the production of spinning nozzle plates, particularly those having profiled nozzle capillaries, in which the critical dimensions of the nozzle capillaries can be reduced, with acceptable costs, to values below the limits realizable with the prior art methods.

These and other objects are attained by providing a method wherein a layer of resist material is deposited on an electrode, the resist layer is irradiated and thereafter selectively removed to produce columns of resist material that serve as negatives of the nozzle capillaries, a further layer which encloses the negatives is deposited on the electrode, the negatives are removed from the further layer, and at least part of the electrode is removed from the further layer.

DESCRIPTION OF THE PREFERRED EMBODIMENTS

Figure 1:
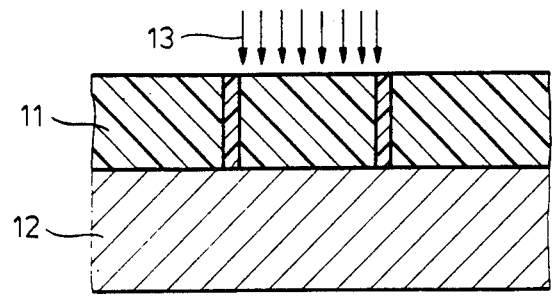
FIG. 1 is a cross-sectional view schematically illustrating a resist layer on a plate-shaped galvanic electrode, and generally shows irradiation of the resist layer in a predetermined pattern during one stage of the method of the present invention.
Figure 2:
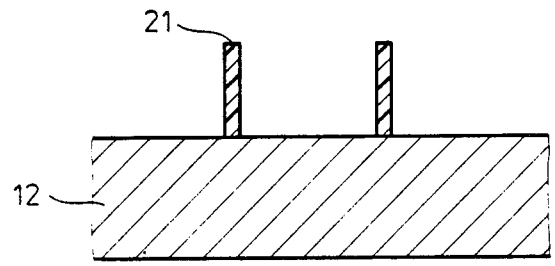
FIG. 2 is a cross-sectional view schematically illustrating the configuration of FIG. 1 after the irradiated resist layer has been selectively removed, thereby leaving columns of resist material which serve as negatives for the nozzle capillaries.
Figure 3:
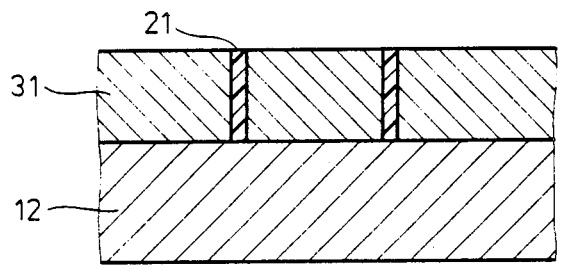
FIG. 3 is a cross-sectional view schematically illustrating the galvanic electrode, negatives of the nozzle capillaries, and a galvanic layer that has been deposited on the galvanic electrode and around the negatives.

In FIG. 1, the reference numeral 12 identifies a plate-shaped galvanic electrode. The term "galvanic" as used herein means "electrically conductive". A layer 11 of resist material, whose characteristics can be changed by high-energy radiation, is deposited on electrode 12. The resist layer 11 is irradiated with high-energy radiation 13 in a predetermined pattern which corresponds to the desired spacing and cross-sectional configuration of the nozzle capillaries that are to be produced. The irradiated layer 11 is then developed, a treatment which utilizes the differences in material properties produced by the radiation, to selectively remove resist material. Columns of resist material that remain connected to galvanic electrode 12 after development serve as negatives 21 (FIG. 2) of the nozzle capillaries that are to be produced. In a galvanic bath, a galvanic layer 31 (FIG. 3) is produced on galvanic electrode 12. Galvanic layer 31 may be deposited by electroplating. As will be apparent from FIG. 3, layer 31 encloses the negatives 21 of the spinning nozzle channels to produce a flush surface. After galvanic layer 31 is levelled and negatives 21 and electrode 12 are removed, a spinning nozzle plate 41 with spinning nozzle channels 42 remains as shown in FIG. 4.

Galvanic electrode 12 can be removed by decomposing it, via dissolution or chemical attack, if electrode 12 is made of a material which decomposes in an agent that does not attack galvanic layer 31. The removal of galvanic electrode 12 is also possible without destroying it by careful removal of galvanic layer 31 from galvanic electrode 12, if the adhesive force of galvanic layer 31 has been reduced in a known manner by appropriate pretreatment, e.g. passivation of galvanic electrode 12.

Figure 5:
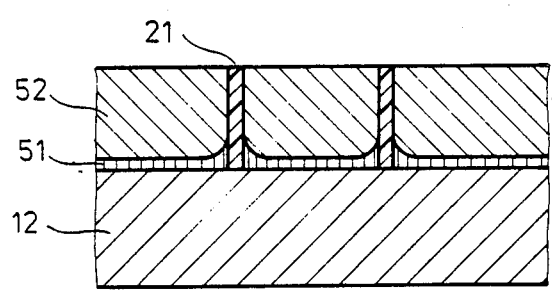
FIGS. 5 and 6 are cross-sectional views which schematically illustrate different stages in a modified embodiment of the method of the present invention, with the galvanic layer in the modified embodiment including a thick portion and a thin portion which is more easily removed than the thick portion.
Figure 6:
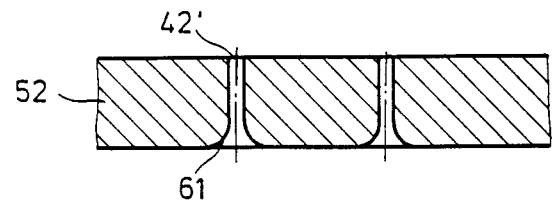

In the modified embodiment of FIGS. 5 and 6, the galvanic layer 31' includes a relatively thin galvanic portion 51 (FIG. 5) of a material that is easy to decompose and a substantially thicker galvanic portion 52 of a material that is difficult to decompose. The removal of galvanic electrode 12 is then possible, without destroying it and without endangering the galvanic portion 52 (which provides the spinning nozzle plate), by decomposing the galvanic portion 51. A further advantage of this modified embodiment is that the thin galvanic portion 51 grows faster in the immediate vicinity of the negatives 21 of the nozzle capillaries than in the other regions. Thus, after galvanic portion 51 has been decomposed, nozzle capillaries 42' are wider at one end 61 (FIG. 6), thus making them suitable as feed funnels for the material to be spun.

Figure 4:
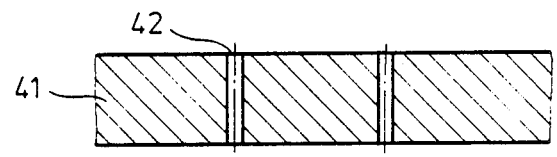
FIG. 4 is a cross-sectional view schematically illustrating the capillary channels which remain in the galvanic layer after the galvanic electrode and negatives have been removed from the configuration of FIG. 3.

It should be noted that the spinning nozzle plate shown in FIG. 4 can also be provided with feed funnels or preliminary channels which are connected with the nozzle capillaries, if desired. This can be accomplished, for example, by mechanical machining or by electroerosion. In this connection, if mechanical machining is employed it may be advisable to do so before the negatives 21 are removed from nozzle capillaries 42.

If the spinning nozzle plate is to be subjected to high pressure in operation, it may be advisable to permanently connect the spinning nozzle plate to a plate provided with preliminary channels, with these preliminary channels being designed, with respect to their shape and position, so that they follow the nozzle capillaries. The permanent connection may be realized, for example, by soldering or diffusion welding.

Figure 7:
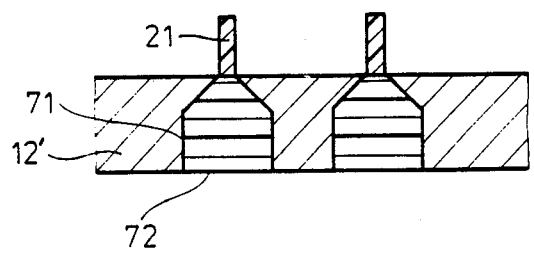
FIGS. 7 and 8 are cross-sectional views which schematically illustrate different stages in another modified embodiment of the method of the present invention, with the galvanic electrode having channels which are initially filled with removable material.
Figure 8:
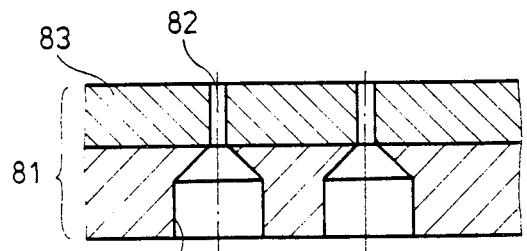

A permanent connection between a galvanic layer having nozzle capillaries and a metal plate containing preliminary channels can be achieved in a particularly simple and economic manner in accordance with another modified embodiment, as illustrated in FIGS. 7 and 8. In these Figures, galvanic electrode 12' is provided with feed or preliminary channels 71 at the positions intended for the nozzle capillaries. These preliminary channels 71 are closed with an easily removable filler material 72 so as to form a flush surface. Instead of removing the entire galvanic electrode 12' from the galvanic layer 83, in the embodiment of FIGS. 7 and 8 only the filler material 72 of galvanic electrode 12' is removed. The resulting spinning nozzle plate 81 has nozzle capillaries 82 in the galvanic layer 83 and preliminary channels 71.

An electrically conductive or an electrically insulating material can be used as the filler material 72. With an electrically conductive filler material, a relatively sharp transition results between nozzle capillaries 82 and preliminary channels 71. With an electrically insulating filler material, a rounded transition is achieved. A rounded transition is generally favorable in practical use, particularly if the minimum diameter of the preliminary channels 71 is selected to be noticeably larger than the diameter of the nozzle capillaries 82.

Figure 9:
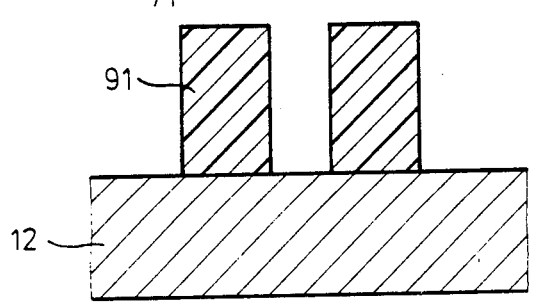
FIGS. 9 through 11 are cross-sectional views which schematically illustrate different stages in a further modified embodiment of the method of the present invention, with the resist columns which serve as negatives for the channel capillaries having enlarged lower portions that provide preliminary channels.
Figure 10:
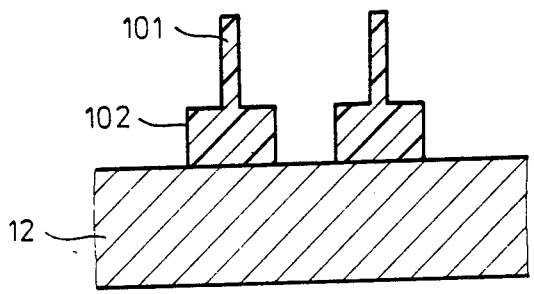
Figure 11:
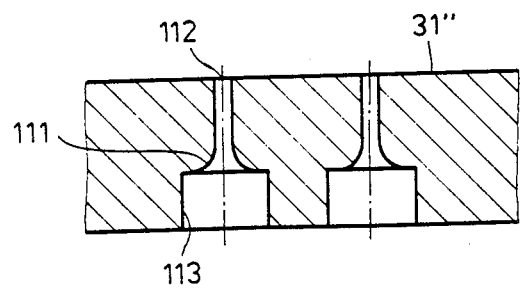

Spinning nozzle plates of particularly high quality can be produced in accordance with the further modified embodiment illustrated in FIGS. 9-11. According to FIG. 9, an initial irradiation step and an initial selective removal of resist material produce resist cylinders 91, which are connected with galvanic electrode 12. The diameter of cylinders 91 is selected to correspond to the desired diameter of the preliminary channels 113. Further irradiation in a predetermined pattern, using radiation with a reduced penetration depth (for example, corpuscular irradiation with particles that are not energetic enough for the particles to pass entirely through cylinders 91), and further selective removal of resist material, result in negatives 101 of the nozzle capillaries. These negatives 101 are connected with galvanic electrode 12 by means of negatives 102 of the preliminary channels. The galvanic layer 31" which is subsequently deposited encloses not only the negatives 102 of the preliminary channels, but also the much thinner negatives 101 of the nozzle capillaries connected therewith. By adapting the spreading capability of the galvanic bath, continuous transitions 111 favorable for practical use can be realized between nozzle capillaries 112 and preliminary channels 113. That is, as the galvanic layer 31" is being deposited, the vertical and horizontal growth rates are such that metal is not deposited right up to the junction of negatives 101 and 102.

Corpuscular radiation as well as electromagnetic waves, particularly X-ray radiation generated by an electron synchrotron (synchrotron radiation), are suitable as the high energy radiation. A mask may be employed to produce the predetermined pattern if electromagnetic waves are used. If corpuscular radiation is used, the predetermined pattern can also be produced by electromagnetic control.

In the embodiment shown in FIGS. 1 to 4, a plate of high-grade steel (material No. 1.4301) is used for the galvanic electrode 12. Resist layer 11 is produced by pouring on a methacrylate based casting resin ("Plexit 74," made by Röhm GmbH, Darmstadt, Federal Republic of Germany) which subsequently hardens. To increase adhesion of PMMA resist layer 11, the surface of galvanic electrode 12 is roughened, before application of the casting resin, by sandblasting it with corundum having an average grain size of 10 $\mu$m. The irradiated resist material is developed in a known manner by means of a liquid developer. Galvanic layer 31 is produced by depositing nickel on galvanic electrode 12 in a nickel sulfamate bath which is free of chloride. The subsequent planing is effected by polish-milling.

Figure 12:
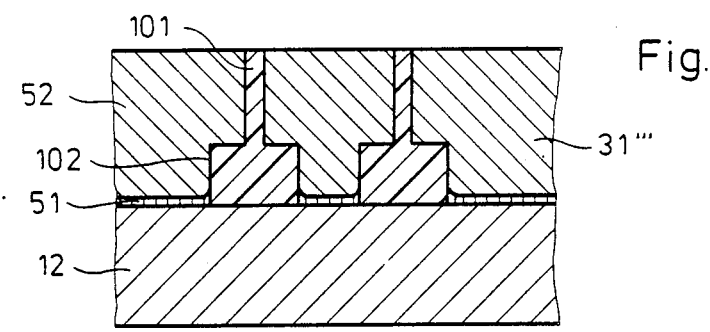
FIG. 12 is a cross-sectional view which schematically illustrates a modified embodiment of the method of the present invention, with the resist columns which serve as negatives for the channel capillaries having enlarged lower portions that provide preliminary channels and with the galvanic layer in the modified embodiment including a thick portion and a thin portion which is more easily removed than the thick portion.

In the embodiment shown in FIGS. 5, 6, and 12, copper is employed for the thin galvanic portion 51. The portion 51 is detached from the galvanic electrode 12 by selectively decomposing the copper in an alkali etching medium.

Figure 13:
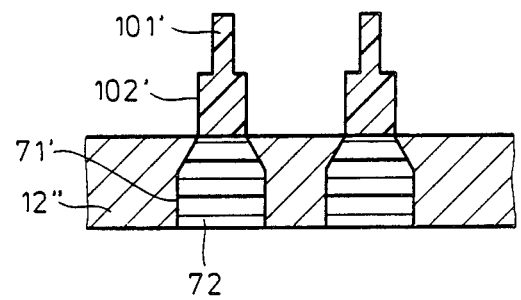
FIG. 13 is a cross-sectional view which schematically illustrates another modified embodiment of the method of the present invention, with the galvanic electrode having channels which are initially filled with removable material and with the resist columns which serve as negatives for the channel capillaries having enlarged lower portions that provide further preliminary channels.

In the embodiment of FIGS. 7, 8, and 13 a non-crosslinking casting resin based on methacrylate ("Plexit M60," made by Röhm GmbH, Darmstadt, Federal Republic of Germany) is used as the filler material 72 for the preliminary channels 71. This material is later removed by dissolving it in dichloromethane.

The irradiation step may be conducted using synchrotron radiation having a characteristic wavelength $\lambda_c=0.2$ nm (in the X-ray range). The exposure is made through an X-ray mask which is composed of a mask substrate of beryllium (which is substantially transmissive for synchrotron radiation and has a thickness of about 20 μm) and an absorber of gold (which is substantially nontransmissive for X-rays and has a thickness of about 15 μm).

It will be understood that the above description of the present invention is susceptible to various modifications, changes and adaptations, and the same are intended to be comprehended within the meaning and range of equivalents of the appended claims.

What we claim is:

1. A method for producing a spinning nozzle plate having nozzle capillaries, comprising the steps of:
   (a) depositing a layer of resist material on a galvanic electrode by pouring on a methacrylate based casting resin PMMA which subsequently hardens, the resist material having positive resist characteristics which are changed by high-energy radiation;
   (b) producing negatives of the nozzle capillaries on the galvanic electrode by irradiating the layer of resist material in a predetermined pattern, using X-ray radiation generated by an electron synchrotron, and thereafter selectively removing the irradiated resist material by development with a liquid developer while utilizing differences in the characteristics thereof produced by the irradiation;
   (c) producing a galvanic layer which encloses the negatives of the nozzle capillaries on the galvanic electrode;
   (d) removing the negatives of the nozzle capillaries; and
   (e) removing at least part of the galvanic electrode.

2. The method of claim 1, further comprising the step of levelling the galvanic layer.

3. The method of claim 1, wherein the negatives of the nozzle capillaries have respective enlarged portion adjacent the galvanic electrode to provide preliminary channels, and wherein step (b) is conducted by repeated irradiation of the resist material and repeated selective removal thereof.

4. The method of claim 1, wherein step (c) is conducted by depositing a first portion of the galvanic layer using an easily decomposable material and then depositing a second portion of the galvanic layer using a difficultly decomposable material, the first portion being thinner than the second portion, and wherein step (e) is conducted by decomposing the first portion of the galvanic layer.

5. The method of claim 4, wherein the negatives of the nozzle capillaries have respective enlarged portions adjacent the galvanic electrode to provide preliminary channels, and wherein step (b) is conducted by repeated irradiation of the resist material and repeated selective removal thereof.

6. The method of claim 1, wherein the galvanic electrode comprises a plate having a surface and preliminary channels to the surface, and easily removable filler material disposed in the channels and flush with the surface, and wherein step (e) is conducted by removing only the filler material.

7. The method of claim 6, wherein the negatives of the nozzle capillaries have respective enlarged portions adjacent the galvanic electrode to provide further preliminary channels each communicating with a respective preliminary channel, and wherein step (b) is conducted by repeated irradiation of the resist material and repeated selective removal thereof.

8. A spinning nozzle plate made by the method of claim 1, wherein at least one nozzle capillary is elongated and has a longitudinal axis, said at least one nozzle capillary additionally having a capillary wall that is spaced apart from the longitudinal axis by a distance that does not exceed about 30 μm.

9. A method for producing a spinning nozzle plate having nozzle capillaries, comprising the steps of:
   (a) depositing a layer of resist material on a galvanic electrode, the resist material having characteristics which are changed by high-energy radiation;
   (b) producing negatives of the nozzle capillaries on the galvanic electrode by irradiating the layer of resist material in a predetermined pattern and thereafter selectively removing resist material while utilizing differences in the characteristics thereof produced by the irradiation;
   (c) producing a galvanic layer which encloses the negatives of the nozzle capillaries on the galvanic electrode, step (c) being conducted by deposit a first portion of the galvanic layer using an easily decomposable material and then depositing a second portion of the galvanic layer using a difficultly decomposable material, the first portion being thinner than the second portion;
   (d) removing the negatives of the nozzle capillaries; and
   (e) removing at least part of the galvanic electrode, step (e) being conducted by decomposing the first portion of the galvanic layer.

10. The method of claim 9, further comprising the step of levelling the galvanic layer.

11. The method of claim 9, wherein the negatives of the nozzle capillaries have respective enlarged portions adjacent the galvanic electrode to provide preliminary channels, and wherein step (b) is conducted by repeated irradiation of the resist material and repeated selective removal thereof.

12. The method of claim 9, wherein the negatives of the nozzle capillaries have respective enlarged portions adjacent the galvanic electrode to provide preliminary channels, and wherein step (b) is conducted by repeated irradiation of the resist material and repeated selective removal thereof.

13. The method of claim 9, wherein the galvanic electrode comprises a plate having a surface and preliminary channels to the surface, and easily removable filler material disposed in the channels and flush with the surface, and wherein step (e) is conducted by removing only the filler material.

14. The method of claim 13, wherein the negatives of the nozzle capillaries have respective enlarged portions adjacent the galvanic electrode provide further preliminary channels each communicating with a respective preliminary channel, and wherein step (b) is conducted by repeated irradiation of the resist material and repeated selective removal thereof.

15. A spinning nozzle plate made by the method of claim 9, wherein at least one nozzle capillary is elongated and has a longitudinal axis, said at least one nozzle capillary additionally having a capillary wall that is spaced apart from the longitudinal axis by a distance that does not exceed about 30 μm.

16. A method for producing a spinning nozzle plate having nozzle capillaries, comprising the steps of:

(a) depositing a layer of resist material on a galvanic electrode, the resist material having characteristics which are changed by high-energy radiation;
(b) producing negatives of the nozzle capillaries on the galvanic electrode by directing X-rays through an X-ray mask to irradiate the layer of resist material in a predetermined pattern, and thereafter selectively removing resist material while utilizing differences in the characteristics thereof produced by the irradiation;
(c) producing a galvanic layer which encloses the negatives of the nozzle cappillaries on the galvanic electrode;
(d) removing the negatives of the nozzle capillaries; and
(e) removing at least part of the galvanic electrode.

17. The method of claim 16, wherein step (b) is conducted using X-rays having a characteristic wavelength of about 0.2 nm.

18. The method of claim 16, wherein step (b) is conducted using an X-ray mask having a beryllium substrate.

19. The method of claim 16, wherein step (b) is conducted using an X-ray mask which comprises gold on a substrate which is transmissive for the X-rays.

* * * * *